(12) United States Patent  (10) Patent No.: US 7,995,121 B2
Kobayashi et al.  (45) Date of Patent: Aug. 9, 2011

(54) IMAGING UNIT, PORTABLE TERMINAL DEVICE, AND PORTABLE TERMINAL SYSTEM

(75) Inventors: Atsushi Kobayashi, Osaka (JP); Takashi Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 620 days.

(21) Appl. No.: 12/033,506

(22) Filed: Feb. 19, 2008

(65) Prior Publication Data
US 2008/0211967 A1   Sep. 4, 2008

(30) Foreign Application Priority Data
Feb. 21, 2007   (JP) .................................. 2007-040195

(51) Int. Cl.
*H04N 5/262*   (2006.01)
(52) U.S. Cl. ....................................................... 348/239
(58) Field of Classification Search .................. 348/586, 348/590, 239
See application file for complete search history.

(56) References Cited

U.S. PATENT DOCUMENTS

| | | | |
|---|---|---|---|
| 4,319,266 A * | 3/1982 | Bannister | 348/587 |
| 5,146,315 A * | 9/1992 | Muller | 348/587 |
| 6,124,887 A * | 9/2000 | Auffret et al. | 348/239 |
| 6,262,778 B1 * | 7/2001 | Nonweiler et al. | 348/586 |
| 2002/0025066 A1 * | 2/2002 | Pettigrew | 382/162 |
| 2004/0165081 A1 * | 8/2004 | Shibaki et al. | 348/222.1 |
| 2006/0045357 A1 * | 3/2006 | Schwartz et al. | 382/232 |
| 2007/0286520 A1 * | 12/2007 | Zhang et al. | 382/264 |
| 2009/0010546 A1 * | 1/2009 | Rossato et al. | 382/199 |

FOREIGN PATENT DOCUMENTS

| | | |
|---|---|---|
| JP | 5-224630 | 9/1993 |
| JP | 10-42307 | 2/1998 |

* cited by examiner

*Primary Examiner* — James M Hannett
(74) *Attorney, Agent, or Firm* — Oblon, Spivak, McClelland, Maier & Neustadt, L.L.P.

(57) ABSTRACT

The present invention provides an imaging unit, a portable terminal device, and a portable terminal system capable of performing a satisfactory key synthesizing process. An imaging unit mainly includes an imaging section, a conversion section, and a key signal generating section. The conversion section converts the format of the imaged image data output from the imaging section from YUV format to RGB format. The key signal generating section generates a key signal based on each pixel data configuring the imaged image data and the reference data for the imaged image data input from the imaging section. The key signal generating section also outputs foreground image data having the generated key signal and the corresponding pixel data of RGB format as minimum configuring unit. An image synthesizing section of a main unit generates synthesized image data by overlapping the foreground image data from the imaging unit and the background image data stored in a RAM based on the key signal contained in the foreground image data.

15 Claims, 7 Drawing Sheets

F I G . 2
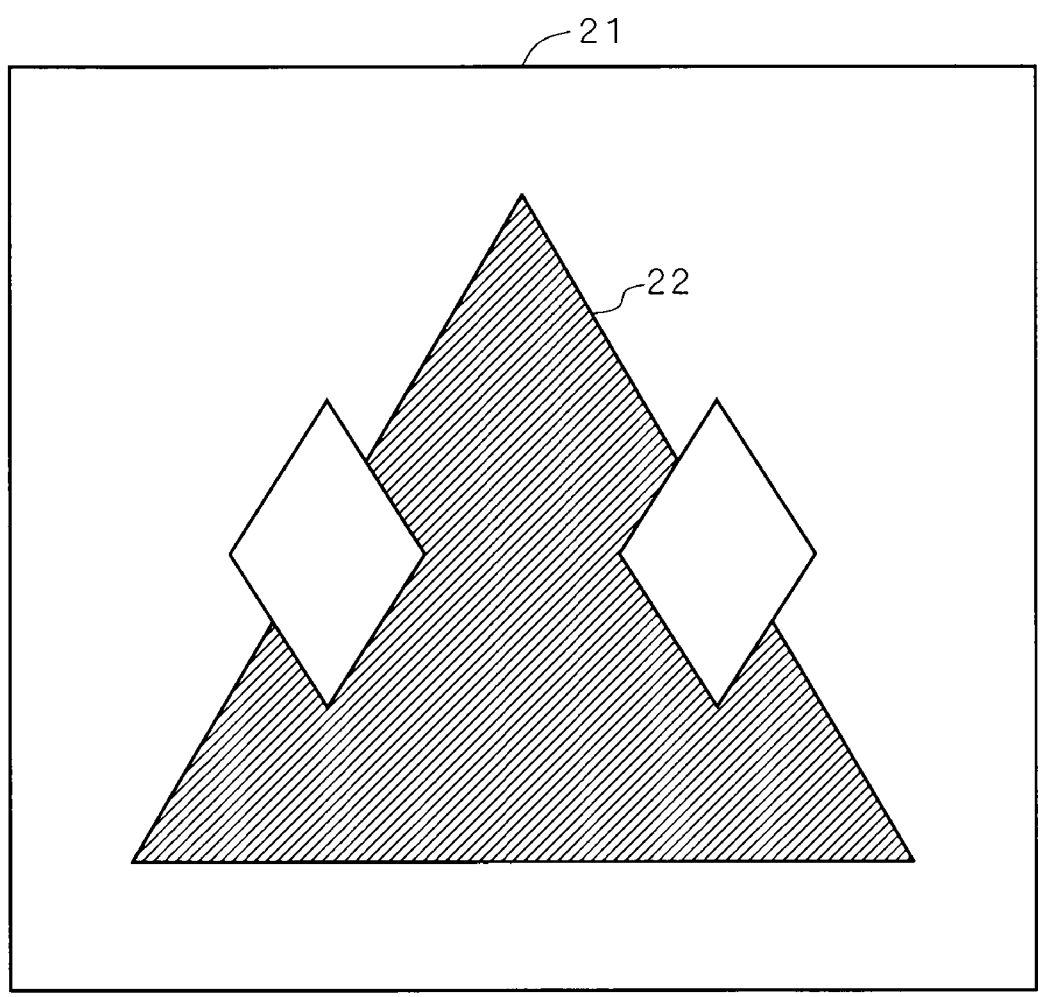

F I G . 3
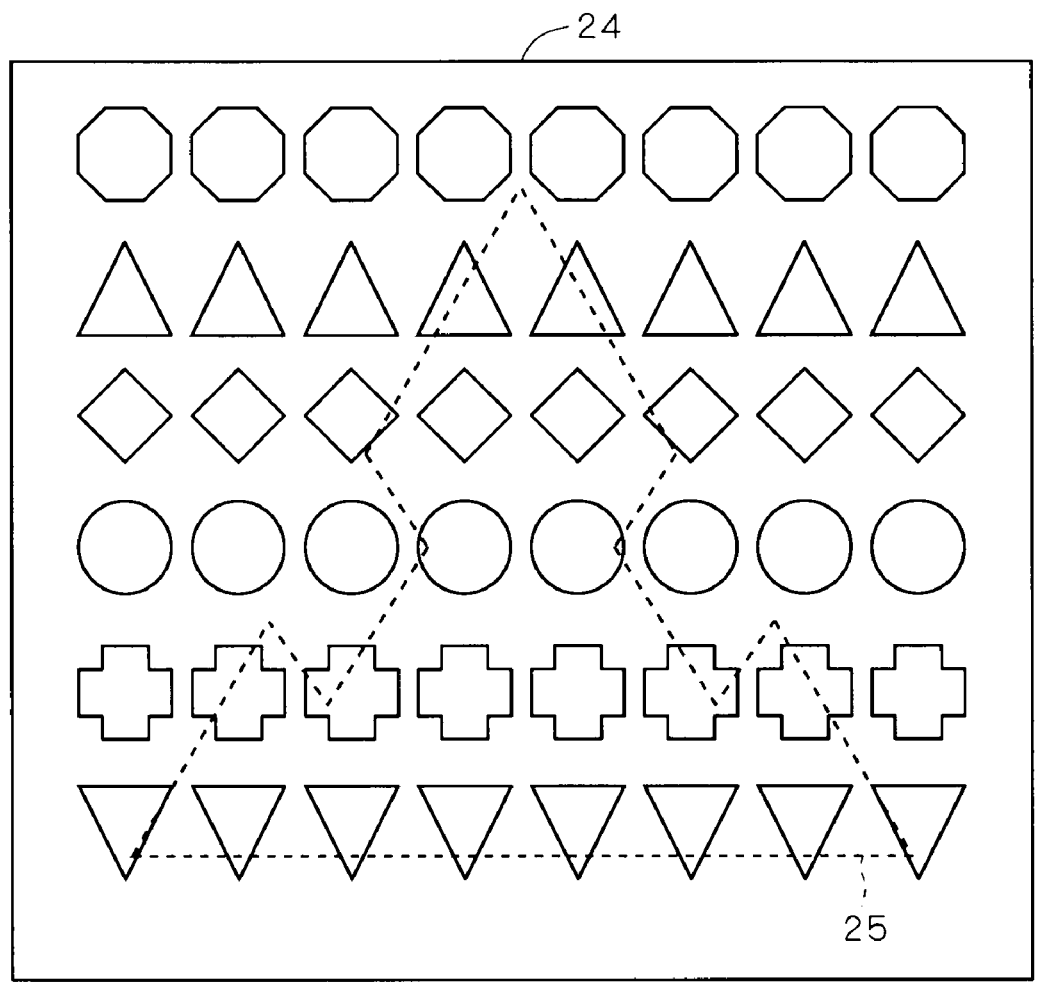

IMAGING UNIT, PORTABLE TERMINAL DEVICE, AND PORTABLE TERMINAL SYSTEM

BACKGROUND OF THE INVENTION

1. Field of the Invention

The present invention relates to key synthesis executed in an imaging unit, a portable terminal device, and a portable terminal system.

2. Description of the Background Art

A technique for key synthesizing imaged image data by a camera and background image data stored in advance is conventionally known (e.g., Japanese Unexamined Patent Publication No. 05-224630 and Japanese Unexamined Patent Publication No. 10-042307).

The imaged image data by a camera (imaging unit) of Japanese Unexamined Patent Publication No. 05-224630 or Japanese Unexamined Patent Publication No. 10-042307 is sent to a processing section for executing a key synthesis process. The processing section executes processes necessary for key synthesis such as (1) process for synthesizing the imaged image data and the background image data, (2) process for setting a transmissive pixel to which corresponding background image data is fitted out of the pixels configuring the imaged image data, and the like. As a result, the calculation cost of the processing section increases in the techniques of Japanese Unexamined Patent Publication No. 05-224630 or Japanese Unexamined Patent Publication No. 10-042307.

SUMMARY OF THE INVENTION

It is an object of the present invention to provide an imaging unit, a portable terminal device, and a portable terminal system enabling a satisfactory key synthesis process.

According to a first aspect of the present invention, the imaging unit generates foreground image data having the pixel data of the imaged image data and the key signal by the key signal generating section as a minimum unit.

The main unit can generate synthesized image data from both image data by simply executing the process of overlapping the foreground image data and the background image data. Thus, the calculation cost on the main unit side can be reduced.

According to a second aspect of the present invention, the process of setting the key signal value based on the color concentration component and the process of setting the key signal value based on the achromatic component can be switched and executed.

The foreground image data including the key signal set by either the first or the second key signal setting part is output to the main unit side. Thus, in the main unit, the optimum overlapping process can be executed according to the state of the imaged image data, and satisfactory synthesized image data can be obtained.

According to a third aspect of the present invention, the reference data can be generated based on the imaged image data by the imaging section.

The overlapping process corresponding to the request of the user can be easily executed, and satisfactory synthesized image data can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view showing one example of imaged image data used in a key synthesis;

FIG. 3 is a view showing one example of background image data used in the key synthesis;

DESCRIPTION OF THE PREFERRED EMBODIMENTS

An embodiment of the present invention will now be described with reference to the drawings.

1. Configuration of Portable Terminal System

Figure 1:
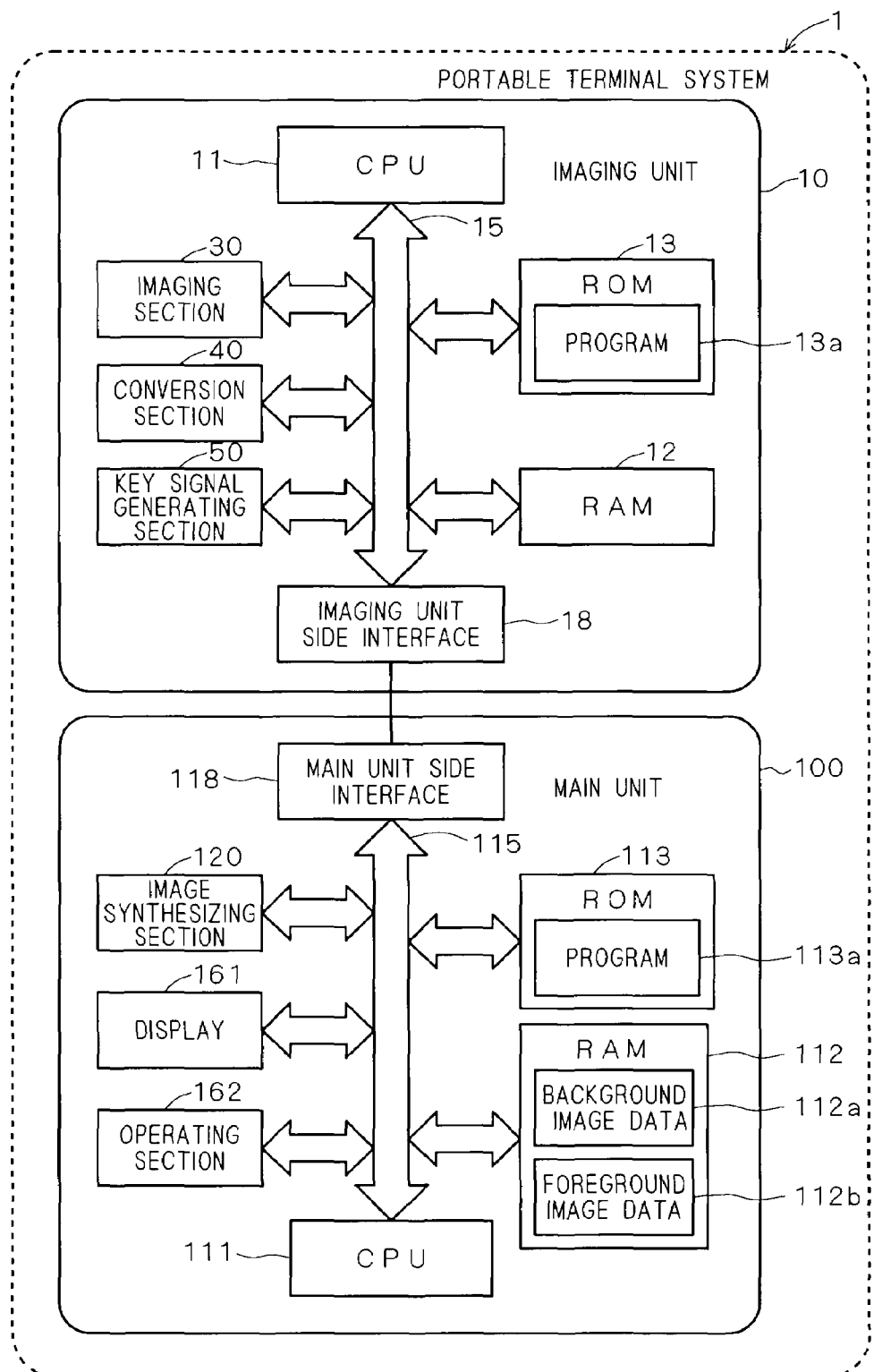
FIG. 1 is a block diagram showing one example of a configuration of a portable terminal system according to an embodiment of the present invention.

FIG. 1 is a block diagram showing one example of a configuration of a portable terminal system 1 according to the embodiment of the present invention. The portable terminal system 1 is an image processing system capable of generating synthesized image data by key synthesizing imaged image data and background image data stored in advance. The portable terminal system 1 is of size and weight that can be carried around. As shown in FIG. 1, the portable terminal system 1 mainly includes an imaging unit 10 and a main unit 100.

In key synthesis of the present embodiment, the pixels configuring the imaged image data are cut out based on a key signal, and corresponding background image data is fitted into the cutout pixel portion of the imaged image data. The image data (e.g., imaged image data, foreground image data, and background image data) handled in the present embodiment may be a still image or a moving image.

Figure 4:
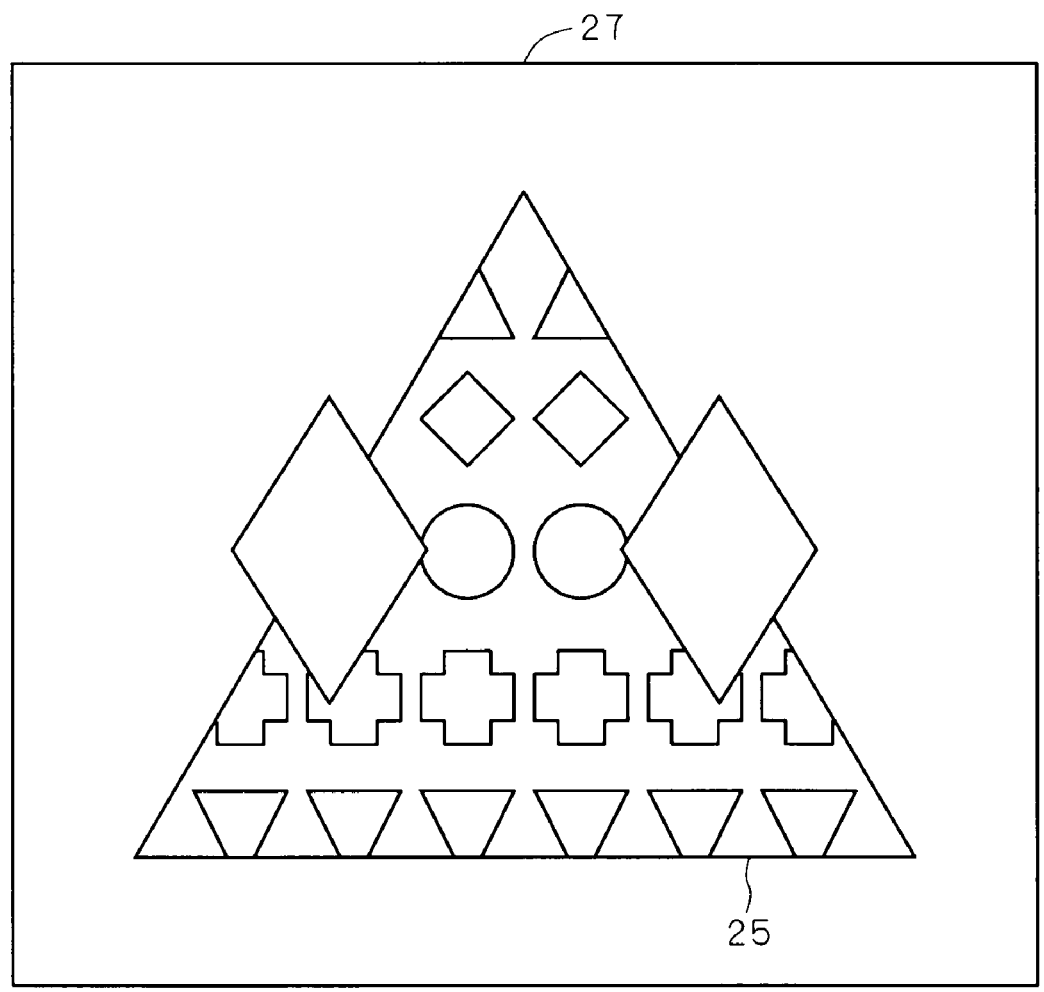
FIG. 4 is a view showing one example of synthesized image data resulting from the key synthesis.

FIG. 2 is a view showing one example of the imaged image data used in the key synthesis. FIG. 3 is a view showing one example of the background image data used in the key synthesis. FIG. 4 is a view showing one example of the synthesized image data resulting from the key synthesis.

When a region 22 (shaded portion) of the imaged image data 21 is the portion cutout based on the key signal (see FIG. 2), the synthesized image data 27 (see FIG. 4) is synthesized from the imaged image data 21 and the background image data 24 (see FIG. 3). That is, the synthesized image data 27 is obtained by overlapping the imaged image data 21 and the corresponding portion 25 of the background image data 24, as shown in FIG. 4.

The imaging unit 10 will be described first. The imaging unit 10 is a camera module detachable with respect to the main unit 100. As shown in FIG. 1, the imaging unit 10 mainly includes an imaging section 30, a conversion section 40, and a key signal generating section 50.

The imaging section 30 includes a CCD (Charge Coupled Devices) image sensor (not shown) or a CMOS (Complementary Metal Oxide Semiconductor) image sensor (not shown), where the light is converted to an electrical signal by such image sensors. The imaging section 30 generates the imaged image data of YUV format based on the electrical signal obtained by the image sensor. That is, each pixel data (first pixel data) configuring the imaged image data has a luminance signal (Y) (one achromatic component), a difference (U) of the luminance signal (Y) and a blue component, and a difference (V) of the luminance signal (Y) and the red component (two chromatic components).

The conversion section 40 converts each pixel data (first pixel data) of the imaged image data output from the imaging section 30 to pixel data (second pixel data) having three color concentration components of red (R), green (G), and blue (B). That is, the imaging unit 10 of the present embodiment is able to handle image data of YUV format output from the imaging section 30 and image data of RGB format generated by the conversion section 40.

The key signal generating section 50 is configured by a so-called ASIC (Application Specific Integrated Circuit). The key signal generating section 50 generates the key signal for setting the transmissive pixel based on the imaged image data, and generates foreground image data that includes the key signal and that is used in the key synthesis in the main unit 100

Each pixel data of the foreground image data used in the present embodiment is configured by one bit of key signal, five bits of B signal, five bits of G signal, and five bits of R signal. With respect to the value of each key signal, "0" is set for the key signal value when fitting the corresponding background image data in the key synthesis, and "1" is set for the key signal value when using the RGB signal of the foreground image data as it is. The detailed configuration of the key signal generating section 50 will be hereinafter described.

A RAM 12 is a readable/writable volatile memory, and a ROM 13 is a read-only memory. An imaging unit side interface 18 electrically connects the imaging unit 10 to the main unit 100, and enables transmission/reception of data and control signal between the units.

A CPU 11 executes a control according to a program 13a stored in the ROM 13. The CPU 11 is electrically connected to the imaging unit side interface 18, the imaging section 30, the conversion section 40, the key signal generating section 50, and the like through a bus line 15. Therefore, the CPU 11 can execute the conversion process of the imaged image data by the conversion section 40, the foreground image data generation process by the key signal generating section 50, and the like at a predetermined timing.

The main unit 100 will now be described. The main unit 100 executes the key synthesis using the foreground image data from the imaging unit 10. As shown in FIG. 1, the main unit 100 mainly includes a RAM 112, an image synthesizing section 120, a display 161, and an operating section 162.

The RAM 112 (storage section) is a readable/writable volatile memory, similar to the RAM 12. The RAM 112 can store the background image data 112a, and foreground image data 112b generated in the imaging unit 10.

The image synthesizing section 120 is a processing section for executing the key synthesizing process, at where the background image data 112a stored in advance in the RAM 112 and the foreground image data output from the imaging unit 10 side are overlapped.

In the present embodiment, the process of setting the transmissive pixel based on the imaged image data has been already executed by the imaging unit 10. Therefore, the image synthesizing section 120 generates the synthesized image data by simply overlapping the foreground image data and the background image data 112a based on the key signal contained in the foreground image data. That is, the calculation cost on the main unit 100 side is reduced by using the imaging unit 10 of the present embodiment.

The process of generating the synthesized image data can be executed in real time even if the image synthesizing section 120 having a relatively low computation processing ability is used since the calculation cost on the main unit 100 side can be reduced.

The display 161 is configured by a liquid crystal display etc., and displays image data imaged by the imaging unit 10, the synthesized image data after key synthesis and the like. If provided with a touch panel function, the display 161 can also be used as an input section for executing data input to the main unit 100.

The operating section 162 is an input section having a button, a keypad (not shown), and the like. The user of the portable terminal system 1 performs an input task based on the displayed content of the display 161 to execute a predetermined operation on the imaging unit 10 and the main unit 100.

A ROM 113 is a read-only memory. A main unit side interface 118 electrically connects the main unit 100 to the imaging unit 10, and enables transmission/reception of data and control signal between the units. The ROM 113 may be an externally attached unit of the main unit 100, and detachably arranged with respect to the main unit 100.

A CPU 111 executes a control according to a program 113a stored in the ROM 113. The CPU 111 is electrically connected to the main unit side interface 118, the image synthesizing section 120, the display 161, the operating section 162, and the like through a bus line 115. Therefore, the CPU 111 can execute the key synthesizing process by the image synthesizing section 120, the displaying process by the display 161, and the like at a predetermined timing.

2. Configuration of Key Signal Generating Section

Figure 5:
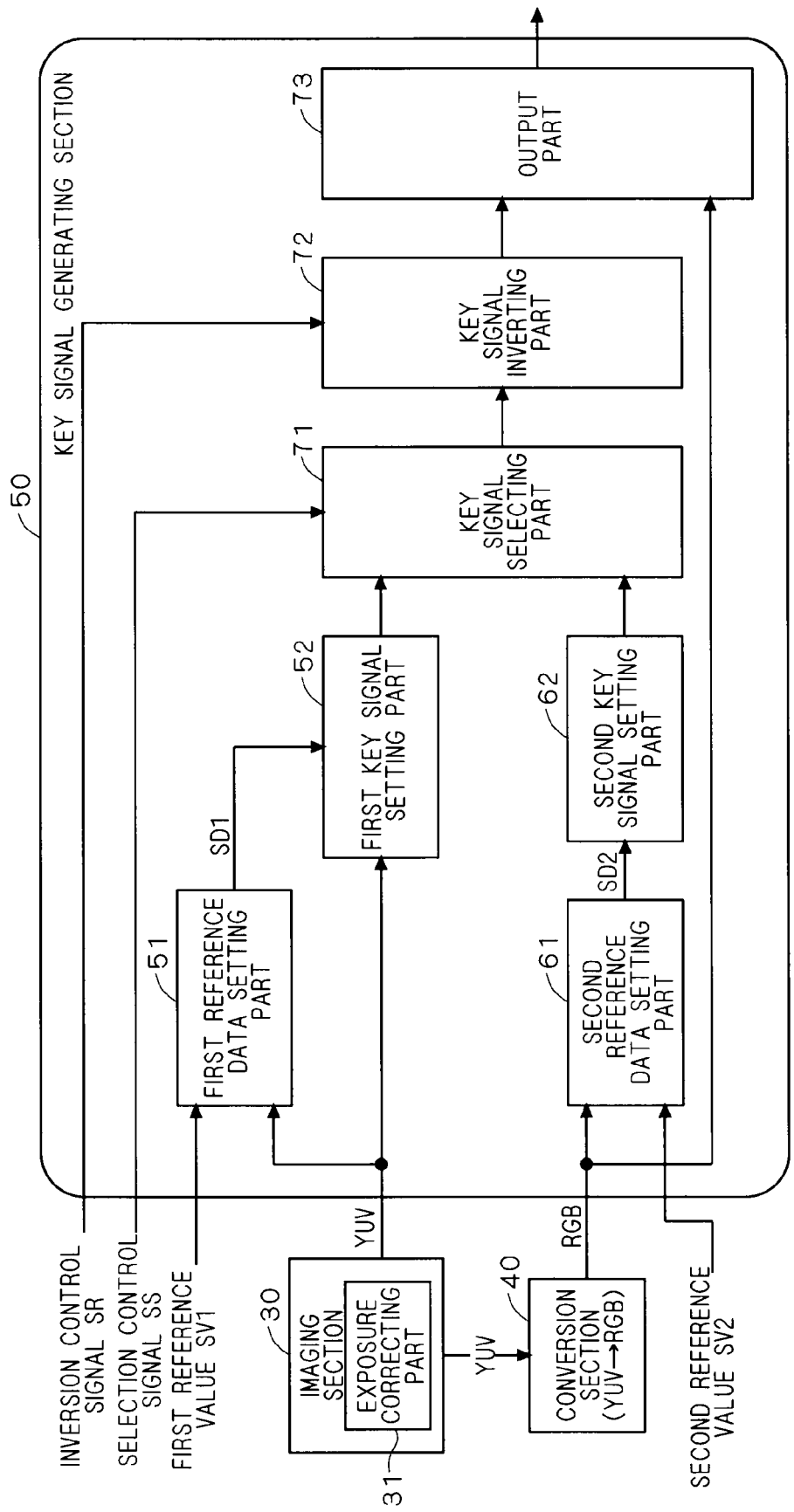
FIG. 5 is a block diagram showing one example of a configuration of a key signal generating section.

FIG. 5 is a block diagram showing one example of a configuration of the key signal generating section 50. The key signal generating section 50 of the imaging unit 10 will be described with reference to FIG. 5.

The key signal generating section 50 generates the key signal based on each pixel data configuring the imaged image data and reference data with respect to the imaged image data input from the imaging section 30. The key signal generating section 50 outputs the foreground image data having the generated key signal and the corresponding pixel data of RGB format as minimum configuring unit. As shown in FIG. 5, the key signal generating section 50 mainly includes first and second reference data setting parts 51, 61, first and second key signal setting parts 52, 62, a key signal selecting part 71, a key signal inverting part 72, and an output part 73.

The reference data is data used in comparison with each pixel data in the process of setting the transmissive pixel to which the corresponding background image data is fitted of the pixels configuring the imaged image data. The reference data may take a constant value or a value within a constant range.

The first reference data setting part 51 sets reference data SD1 based on the luminance signal (Y) of the imaged image data of YUV format. For instance, the reference data SD1 has a constant value (SD1=Y1) or a value having a constant range (Y2≦SD1≦Y3) based on a first reference value SV1 input by the operating section 162 of the main unit 100.

The first key signal setting part 52 sets a key signal value corresponding to each pixel data based on the luminance signal (achromatic component) of the pixel data (first pixel data) of the imaged image data output from the imaging section 30 and the reference data set by the first reference data setting part 51.

The reference data SD1 may be set based on the image data actually imaged by the imaging section 30. That is, the average value of these signals is calculated with respect to the luminance signal (Y) of a predetermined position (e.g., image central portion) of the imaged image data of YUV format output from the imaging section 30. The calculation may be performed by an exposure correcting part 31 for adjusting the gain value of the image sensor (not shown) in the imaging section 30. The first reference data setting part 51 then sets the reference data based on the average value of the luminance signal value (Y) output from the exposure correcting part 31. In this case as well, the reference data may take a constant value or a value having a constant range.

Therefore, when the actually imaged image data is used, the user sets the reference data for the luminance key based on the image displayed on the display 161 of the main unit 100. That is, the user does not need to be concerned with the value of the luminance signal (Y). Therefore, the user can easily execute the overlapping process by the luminance key corresponding to his/her request to obtain satisfactory synthesized image data.

The key signal value by the first key signal setting part 52 may be set in the following manner. With respect to each pixel of the imaged image data output from the imaging section 30, the pixel is set as the transmissive pixel, and "0" is set as the key signal value when the luminance signal (Y) of the pixel is the same as the reference data or is within the reference data range. The pixel is set as the normal pixel and "1" is set as the key signal value when the luminance signal (Y) of the pixel is not the same as the reference data or is outside the reference data range.

The second reference data setting part 61 sets reference data SD2 based on the pixel data (second pixel data) of RGB format converted from the pixel data (first pixel data) of YUV format by the conversion section 40. For instance, the reference data SD2 is set as a constant value (SD2 (R, G, B)=(R1, G1, B1)) or a value having a constant range ((R2, G2, B2)≦SD2(R, G, B)≦(R3, G3, B3)) based on a second reference value SV2 (R, G, B) (=(R1, G1, B1)) input by the operating section 162 of the main unit 100.

The second key signal setting part 62 sets the key signal value corresponding to each pixel based on the pixel data (second pixel data) of RGB format and the reference data set by the second reference data setting part 61.

Similar to the reference data SD1, the reference data SD2 may be set based on the image data actually imaged by the imaging section 30. That is, the second reference data setting part 61 calculates the average values of each of R, G, and B with respect to the imaged image data of RGB format output from the conversion section 40. The average value is calculated using a plurality of pixel data positioned at the central portion of the imaged image. The second reference data setting part 61 sets the reference data based on such an average value. In this case as well, the reference data may take a constant value or a value having a constant range.

Therefore, the user can generate the reference data based on the image displayed on the display 161 of the main unit 100. The user can set the reference data for chroma-key according to the image displayed on the display 161 of the main unit 100 without being concerned with the value of each RGB signal. Thus, the user can easily execute the overlapping process by the chroma-key corresponding to his/her request to obtain satisfactory synthesized image data.

The key signal value of the second key signal setting part 62 may be set in the following manner. With respect to each pixel of the imaged image data converted by the conversion section 40, the pixel is set as the transmissive pixel and "0" is set as the key signal value when each color concentration component (RGB signal) of the pixel is the same as the reference data or is within the reference data range. The pixel is set as the normal pixel, and "1" is set as the key signal value when each color concentration component of the pixel is not the same as the reference data or is outside the reference data range.

The key signal selecting part 71 selects the key signal output from either the first or the second key signal setting part 52, 62 based on a selection control signal SS. The key signal selecting part 71 outputs the selected key signal to the key signal inverting part 72. If the key signal for the luminance key is selected, the key signal selecting part 71 outputs the key signal from the first key signal setting part 52 to the key signal inverting part 72. If the key signal for the chroma-key is selected, the key signal selecting part 71 outputs the key signal from the second key signal setting part 62 to the key signal inverting part 72.

If both the key signal for the luminance key and the key signal for the chroma-key are not selected, the key signal selecting part 71 outputs "0" (correspond to when setting the corresponding pixel as the transmissive pixel) as an initial value. The selection control signal SS may be provided from the main unit 100 side based on the operation of the operating section 162 or may be set in advance based on a dip switch (not shown) and the like of the imaging unit 10.

The key signal inverting part 72 executes EXCLUSIVE OR operation for the output signal from the key signal selecting part 71 and an inversion control signal SR. The key signal inverting part 72 outputs the result of EXCLUSIVE OR operation to the output part 73. When inverting the output signal from the key signal selecting part 71 and outputting, "1" is input to the key signal inverting part 72 as the inversion control signal. When outputting the output signal as it is without inverting the output signal from the key signal selecting part 71, "0" is input as the inverted signal to the key signal inverting part 72.

The inversion control signal SR may be provided from the main unit 100 side based on the operation of the operating section 162, or may be set in advance based on the dip switch (not shown) and the like of the imaging unit 10.

The output part 73 outputs the foreground image data having the key signal (key signal set in the first key signal setting part 52 or the second key signal setting part 62) input from the key signal inverting part 72 and the corresponding pixel data (second pixel data) as a minimum unit. Therefore, for each pixel, the image data configured by one bit of key signal, five bits of B signal, five bits of G signal, and five bits of R signal can be input to the main unit 100.

3. Advantages of Imaging Unit and Portable Terminal System of the Present Embodiment Therefore, the imaging unit 10 and the portable terminal system 1 of the present embodiment generates the foreground image data having the pixel data imaged by the imaging section 30 and converted to RGB format and the key signal by the key signal generating section 50 as the minimum unit, and outputs the foreground image data to the main unit 100 side. Thus, the main unit 100 does not need to generate the key signal, and can generate the synthesized image data from the foreground image data and the background image data by simply executing the process of overlapping the foreground image data and the background image data. The calculation cost on the main unit 100 side thus can be reduced.

4. Variants

The embodiment of the present invention has been described above, but the present invention is not limited to such an embodiment and various modifications may be made.

(1) In the present embodiment, the program 13a of the imaging unit 10 and the program 113a of the main unit 100 are stored in the read-only ROM 13 and the ROM 113, respectively, but is not limited thereto. A flash memory, which is a readable/writable non-volatile memory may be used for the ROM 13, 113.

(2) In the present embodiment, the background image data is stored in the RAM 112, but the storage location is not limited to the RAM 112. The background image data may be stored in other storage devices (e.g., mass storage device such as a hard disc drive, or flash memory card such as an SD memory card) arranged in the main unit 100.

(3) In the present embodiment, each pixel data of the foreground image data is described as being configured by one bit of key signal, five bits of B signal, five bits of G signal, and five bits of R signal, but is not limited thereto. For instance, each signal of RGB may have eight bits of information amount.

(4) In the present embodiment, the corresponding pixel of the background image data is transmissive when the key signal value is "0" and the corresponding pixel of the background image data is non-transmissive when the key signal value is "1", but is not limited thereto. For instance, when the key signal value is "1", the pixel of the foreground image data may be transmissive with a predetermined transmissivity, so that the corresponding pixel of the background image data can be seen.

(5) The information amount of the key signal has been described as being one bit, but is not limited thereto and may be two or more bits. In this case, the transmissivity of the foreground image data may be set according to the key signal value. If the information amount of the key signal value is two bits, the pixel may be set as "transmissive", "non-transmissive", "transmissivity of 30%", and "transmissivity of 60%"for when the key signal value is "0", "1", "2", and "3".

Figure 6:
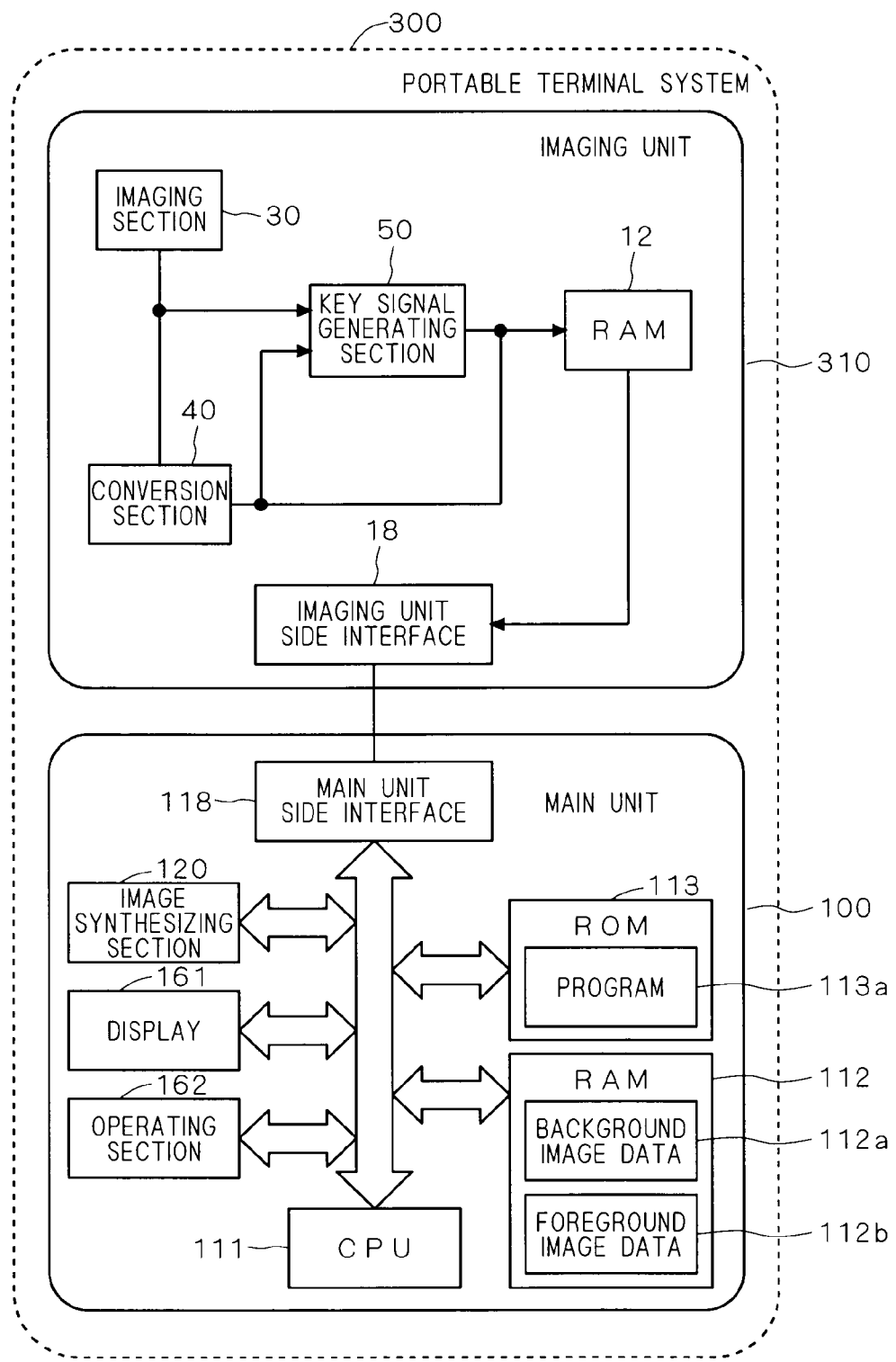
FIG. 6 is a block diagram showing another example of a configuration of a portable terminal system.

(6) In the present embodiment, the imaging unit 10 has been described as including the CPU 11 (see FIG. 1), but is not limited thereto. FIG. 6 is a block diagram showing one example of a configuration of a portable terminal system 300. Among the components in FIG. 6, the same reference numerals are denoted for the components same as in FIG. 1, and the description thereof will be omitted.

Therefore, even in the portable terminal system 300 using the imaging unit 310 where the CPU is not arranged, the foreground image data having the pixel data imaged by the imaging section 30 and converted to RGB format and the key signal by the key signal generating section 50 as a minimum unit can be generated. Thus, similar to the portable terminal system 1, the calculation cost on the main unit 100 side can be reduced with respect to the generation of the synthesized image data.

(7) In the present embodiment, the imaging unit 10 is detachable with respect to the main unit 100 and thus the units 10, 100 have been described as separate units, but are not limited thereto.

Figure 7:
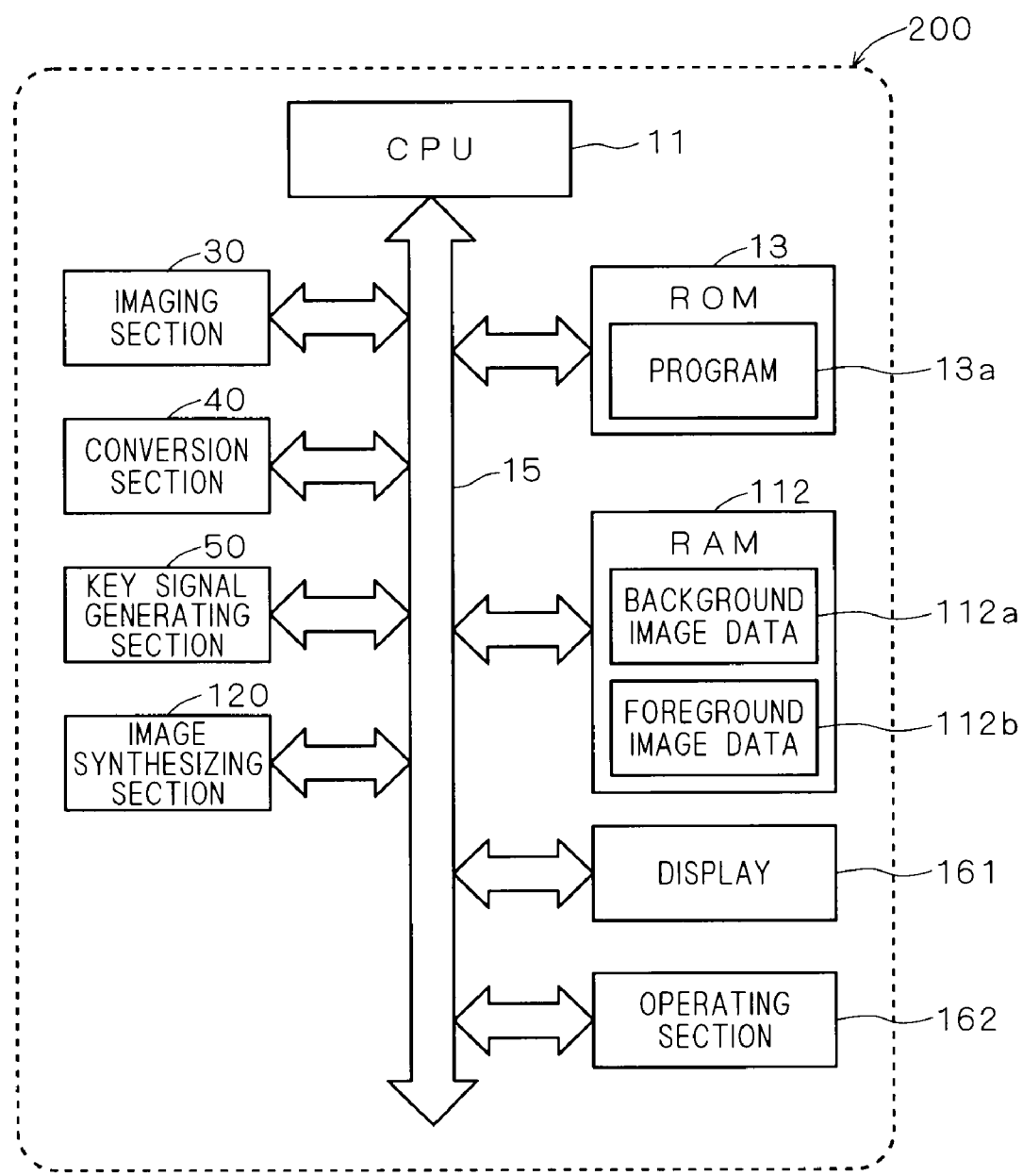
FIG. 7 is a block diagram showing one example of a portable terminal device.

FIG. 7 is a block diagram showing one example of a configuration of a portable terminal device 200. Among the components in FIG. 7, the same reference numerals are denoted for the components same as in FIG. 1, and the description thereof will be omitted. The integrally configured portable terminal device 200 can execute the imaging function, the conversion function, and the key signal generating section executed in the imaging unit 10 of FIG. 1, a well as the image synthesizing function, the displaying function, and the operating function executed in the main unit 100 in FIG. 1. The portable terminal device 200 is of size and weight that can be carried around, similar to the portable terminal system 1.

Therefore, the portable terminal device 200 can switch and execute the process of setting the key signal value based on the pixel data of RGB format, and the process of setting the key signal value based on the luminance signal (Y) of the pixel data of YUV format. Therefore, the optimum overlapping process can be executed according to the state of the imaged image data by the portable terminal device 200 to obtain the satisfactory synthesized image data.

While the invention has been shown and described in detail, the foregoing description is in all aspects illustrative and not restrictive. It is therefore understood that numerous modifications and variations can be devised without departing from the scope of the invention.

What is claimed is:

1. A portable terminal system comprising:
a main unit; and
an imaging unit detachable with respect to said main unit, wherein
said imaging unit includes:
an imaging section, and
a key signal generating section configured
to generate a key signal based on each pixel data of imaged image data and reference data with respect to said imaged image data input from said imaging section, and
to output foreground image data having said generated key signal and corresponding pixel data as a minimum configuring unit, and
said main unit includes:
a storage section configured to store background image data, and
an image synthesizing section configured to overlap said background image data stored in said storage section and said foreground image data output from said imaging unit based on said key signal contained in said foreground image data,
wherein
said imaging unit further includes a conversion section configured to convert first pixel data, which is pixel data configuring said imaged image data, including one achromatic component and two chromatic components to second pixel data including three color concentration components, and
said key signal generating section includes:
a first key signal setting part configured to set each key signal value based on said achromatic component of said first pixel data output from said imaging section side and said reference data, and
an output part configured to output said foreground image data having said key signal set by said first signal setting part and said second pixel data as a minimum unit.

2. A portable terminal system comprising:
a main unit; and
an imaging unit detachable with respect to said main unit, wherein
said imaging unit includes:
an imaging section, and
a key signal generating section configured
to generate a key signal based on each pixel data of imaged image data and reference data with respect to said imaged image data input from said imaging section, and to output foreground image data having said generated key signal and corresponding pixel data as a minimum configuring unit, and said main unit includes:

a storage section configured to store background image data, and an image synthesizing section configured to overlap said background image data stored in said storage section and said foreground image data output from said imaging unit based on said key signal contained in said foreground image data, wherein said imaging unit further includes a conversion section configured to convert first pixel data, which is pixel data configuring said imaged image data, including one achromatic component and two chromatic components to second pixel data including three color concentration components, and said key signal generating section includes:

a second key signal setting part configured to set each key signal value based on second pixel data converted from said first pixel data by said conversion section, and said reference data, and an output part configured to output said foreground image data having said key signal set by said second key signal setting part and said second pixel data as a minimum unit.

3. A portable terminal system comprising:

a main unit; and an imaging unit detachable with respect to said main unit, wherein said imaging unit includes:

an imaging section, and a key signal generating section configured to generate a key signal based on each pixel data of imaged image data and reference data with respect to said imaged image data input from said imaging section, and to output foreground image data having said generated key signal and corresponding pixel data as a minimum configuring unit, and said main unit includes:

a storage section configured to store background image data, and an image synthesizing section configured to overlap said background image data stored in said storage section and said foreground image data output from said imaging unit based on said key signal contained in said foreground image data, wherein said imaging unit further includes a conversion section configured to convert first pixel data, which is pixel data configuring said imaged image data, including one achromatic component and two chromatic components to second pixel data including three color concentration components, and said key signal generating section includes:

a first key signal setting part configured to set each key signal value based on said achromatic component of said first pixel data output from said imaging section side and said reference data, a second key signal setting part configured to set each key signal value based on second pixel data converted from said first pixel data by said conversion section, and said reference data, and an output part configured to output said foreground image data having said key signal set by said first or second key signal setting part and said second pixel data as a minimum unit.

4. The portable terminal system according to claim 1, wherein said key signal generating section further includes a first reference data setting part configured to set said reference data based on said achromatic component of each first pixel data output from said imaging section.

5. The portable terminal system according to claim 3, wherein said key signal generating section further includes a first reference data setting part configured to set said reference data based on said achromatic component of each first pixel data output from said imaging section.

6. The portable terminal system according to claim 2, wherein said key signal generating section further includes a second reference data setting part configured to set said reference data based on each second pixel data converted from said first pixel data by said conversion section.

7. The portable terminal system according to claim 3 wherein said key signal generating section further includes a second reference data setting part configured to set said reference data based on each second pixel data converted from said first pixel data by said conversion section.

8. An imaging unit, detachable with respect to a main unit, for outputting foreground image data to be overlapped with background image data in said main unit to said main unit, the imaging unit comprising:

an imaging section; and a key signal generating section configured to generate a key signal based on each pixel data of imaged image data and reference data with respect to said imaged image data input from said imaging section, and output said foreground image data having said generated key signal and corresponding pixel data as a minimum configuring unit, wherein overlapping of said foreground image data and said background image data is performed based on said key signal, said imaging section outputs imaged image data configured with first pixel data as a minimum unit for said first pixel data including one achromatic component and two chromatic components to said key signal generating section, the imaging unit further includes a conversion section configured to convert said first pixel data, which is pixel data configuring said imaged image data, including one achromatic component and two chromatic components to second pixel data including three color concentration components, and said key signal generating section includes:

a first key signal setting part configured to set each key signal value based on said achromatic component of said first pixel data output from said imaging section side and said reference data, and an output part configured to output said foreground image data having said key signal set by said first signal setting part and said second pixel data as a minimum unit.

9. An imaging unit, detachable with respect to a main unit, for outputting foreground image data to be overlapped with background image data in said main unit to said main unit, the imaging unit comprising:

an imaging section;

a key signal generating section configured to generate a key signal based on each pixel data of imaged image data and reference data with respect to said imaged image data input from said imaging section, and output said foreground image data having said generated key signal and corresponding pixel data as a minimum configuring unit; and a conversion section configured to convert first pixel data, which is pixel data configuring said imaged image data, including one achromatic component and two chromatic components to second pixel data including three color concentration components, wherein overlapping of said foreground image data and said background image data is performed based on said key signal, and said key signal generating section includes:

a second key signal setting part configured to set each key signal value based on second pixel data converted from said first pixel data by said conversion section, and said reference data, and an output part configured to output said foreground image data having said key signal set by said second key signal setting part and said second pixel data as a minimum unit.

10. An imaging unit, detachable with respect to a main unit, for outputting foreground image data to be overlapped with background image data in said main unit to said main unit, the imaging unit comprising:

an imaging section;

a key signal generating section configured to generate a key signal based on each pixel data of imaged image data and reference data with respect to said imaged image data input from said imaging section, and output said foreground image data having said generated key signal and corresponding pixel data as a minimum configuring unit; and a conversion section configured to convert first pixel data, which is pixel data configuring said imaged image data, including one achromatic component and two chromatic components to second pixel data including three color concentration components, wherein overlapping of said foreground image data and said background image data is performed based on said key signal, said key signal generating section includes:

a first key signal setting part configured to set each key signal value based on said achromatic component of said first pixel data output from said imaging section side and said reference data, a second key signal setting part configured to set each key signal value based on second pixel data converted from said first pixel data by said conversion section, and said reference data, and an output part configured to output said foreground image data having said key signal set by said first or second key signal setting part and said second pixel data as a minimum unit.

11. The imaging unit according to claim 8, wherein said key signal generating section further includes a first reference data setting part configured to set said reference data based on said achromatic component of each first pixel data output from said imaging section.

12. The imaging unit according to claim 10, wherein said key signal generating section further includes a first reference data setting part configured to set said reference data based on said achromatic component of each first pixel data output from said imaging section.

13. The imaging unit according to claim 9, wherein said key signal generating section further includes a second reference data setting part configured to set said reference data based on each second pixel data converted from said first pixel data by said conversion section.

14. The imaging unit according to claim 10, wherein said key signal generating section further includes a second reference data setting part configured to set said reference data based on each second pixel data converted from said first pixel data by said conversion section.

15. A portable terminal device comprising:

an imaging section;

a conversion section configured to convert first pixel data, which is pixel data configuring imaged image data, including one achromatic component and two chromatic components to second pixel data including three color concentration components;

a key signal generating section configured to generate a key signal based on each pixel data of imaged image data and reference data with respect to said imaged image data input from said imaging section, and to output foreground image data having said generated key signal and corresponding pixel data as a minimum configuring unit;

a storage section configured to store background image data; and an image synthesizing section configured to overlap said background image data stored in said storage section and said foreground image data output from said imaging unit based on each key signal, wherein said key signal generating section includes:

a first key signal setting part configured to set each key signal value based on second pixel data converted from said first pixel data by said conversion section, and said reference data;

a second key signal setting part configured to set each key signal value based on said achromatic component of said first pixel data and said reference data; and an output part configured to output said foreground image data having said key signal set by said first or second key signal setting part and said second pixel data as a minimum unit.

* * * * *